United States Patent Office 3,400,112
Patented Sept. 3, 1968

3,400,112
POLYMERIZATION CATALYSTS AND PROCESS
John Boor, Jr., El Cerrito, and Edward A. Youngman, Lafayette, Calif., assignors to Shell Oil Company, New York, N.Y., a corporation of Delaware
No Drawing. Filed Nov. 2, 1964, Ser. No. 408,319
12 Claims. (Cl. 260—93.7)

ABSTRACT OF THE DISCLOSURE

A process is disclosed for polymerizing alphamonoolefins in the presence of hydrogen at an increased rate of polymerization. The process comprises contacting the monoolefin in a liquid reaction mixture which is saturated with hydrogen with a catalyst consisting of the reaction product of a catalytically active titanium trichloride and a catalytically effective amount of an amine or phosphine which has a $pK_a$ value greater than −4 and a molecular volume in the range from that of triethyl amine to that of tridodecyl-amine said reaction product being free of metal organic compounds.

---

This invention relates to the polymerization of unsaturated hydrocarbons.

It is now well-known that solid linear polymers of alpha-olefins may be catalytically prepared at low temperatures and pressures. Broadly, suitable catalysts as known heretofore are formed from a transition metal compound and a metal-organic compound capable of acting as a reducing agent. These catalysts are known as Ziegler or Ziegler-Natta catalysts. Numerous modifications of such catalysts have been described in patents and much has been written in the literature concerning the possible mechanisms by which the catalysts act in polymerization. This is discussed, for example, by Bawn et al. in "Quarterly Reviews" 16, 361 (1962).

Polyolefins of stereoregular structure, as typified by isotactic polypropylene, are particularly desirable commercial products. The methods heretofore known for producing such polymers as the direct conversion product of the polymerization reaction generally employ a metal organic compound as a co-catalyst with one of a few particularly effective transition metal compounds, specifically halides of metals of the fourth and fifth group of the Periodic Table in a state of reduced valence, and most particularly titanium trichloride. The organometallic compounds employed almost invariably are aluminum trialkyls or aluminum alkyl halides, and most particularly aluminum diethylmonochloride.

We have now found that alpha-monoolefins including ethylene can be converted in a direct polymerization to highly stereoregular polymers by contact with an active crystalline form of titanium trichloride which is completely free of any metal-organic compounds, provided there is present one of a selected group of activating metal-free organic compounds which are described in greater detail below.

Catalysts prepared from commercially available forms of active titanium trichloride together with representative additives of this invention result in low rates of conversion of olefin to polymer. However, the total polymer is of high stereospecificity.

An improvement in the process of polymerizing olefins by contact with these metal alkyl-free titanium trichloride catalysts has been found which has resulted in a manyfold increase in the conversion rate obtainable with these catalysts. In the preferred mode of practicing the present invention with utilization of said improvement, olefin is polymerized by contact with certain of the catalysts of this invention in a reaction mixture which contains hydrogen.

It is an object of this invention to provide a novel polymerization process for the conversion of alpha-monoolefins to highly stereoregular polymers by contact with catalysts which are free of metal-organic compounds. Another object is to provide improvements resulting in substantial increases in the catalytic activity of promoted, metal-organic-compound-free titanium trichloride catalysts.

According to this invention alpha-monoolefins are polymerized to solid, stereoregular polymers by contact in the presence of hydrogen with a catalyst formed by admixing (1) a catalytically active form of titanium trichloride with (2) an organic metal-free compound which has the chemical properties of a Lewis base and in which the basic group or atom is surrounded by organic groups of moderate bulkiness, as hereinafter exemplified in substantial detail.

In the preferred mode of the process of this invention, olefins are polymerized in the presence of certain of the above-described catalysts and in the presence of a substantial proportion of hydrogen.

One essential component of the catalyst compositions of this invention is a catalytically active form of transition metal halide, and preferably of titanium trichloride. This may be the beta, gamma or delta crystalline form of titanium trichloride. Aluminum chloride may also be present in the crystal structures. Typical is the compound which has the approximate formula $Al_xTi_yCl_z$ wherein the values of $x$, $y$ and $z$ are approximately 1, approximately 3 and approximately 12, respectively.

The titanium trichloride may be prepared by known methods, including reduction of titanium tetrachloride by means of hydrogen, by means of a reducing metal such as aluminum, or by means of metal organic compounds such as aluminum trialkyls. In the latter case, the solid titanium trichloride is washed with a suitable liquid which is a solvent for the metal-organic compound in order to free the titanium trichloride of all remaining residue of metal-organic compound.

Suitable for use in this invention are commercially available forms of titanium trichloride such as that designated $TiCl_3$-HA and that designated $TiCl_3$-AA, both sold by Stauffer Chemical Company. These are understood to be prepared by reduction of titanium tetrachloride with hydrogen and aluminum, respectively, without employment of any metal-organic compounds.

The preparation of titanium trichloride by reduction of the tetrachloride with metal-organic compounds is also well-known. A typical preparation is described, for example, in U.S. 2,971,925 to Winkler et al. Washing out the remaining metal-organic compound presents no difficulties to the person skilled in this art.

Solid $TiCl_3$ produced by any method, but particularly that produced by reduction with inorganic reducing agents, can suitably be made more catalytically active by grinding it, such as in a ball mill in an inert atmosphere, and, preferably, in a hydrogen-containing atmosphere at room temperature or elevated temperature. Conditions are selected to prevent any significant oxidation or reduction of titanium trichloride during this activation.

While this invention is particularly directed to the modification of metal alkyl-free catalysts in which the transition metal halide compound is titanium trichloride it may also be applied to other transition metal halides in their lower valence state which are known to be Ziegler-type catalysts when assisted by metal alkyls. Representative of these are vanadium trichloride and zirconium trichloride.

The effective additives for activating metal-organic-free titanium trichloride are selected from the group of compounds which are Lewis bases with respect to titanium trichloride. The basicity and steric bulk of each additive compound are mutually interrelated factors and no simple rule can define the limits of each precisely. However, in general, the effective bases should have a $pK_a$ of greater than −4. Bases having $pK_a$ values up to 10 or higher may be found suitable. The most effective additives have moderate bulk, the minimum bulkiness being that of triethyl amine and the maximum about that of tridodecyl amine.

A theory with respect to the chemical interraction between the effective Lewis base additives and titanium trichloride is set forth in our communication in Polymer Letters, volume 2, pp. 265–268 (1964).

The Lewis bases for use according to this invention are preferably selected from groups consisting of aliphatic amines and phosphines. The suitable amines comprise the following groups: (1) aliphatic tertiary amines having 5 to 36 carbon atoms per molecule and preferably having from 5 to 20 carbon atoms per molecule; (2) aliphatic secondary amines having 6 to 24 carbon atoms per molecule and preferably having from 8 to 20 carbon atoms per molecule; and (3) heterocyclicnitrogen compounds having 5 or 6 membered rings, including those having an alkyl radical substituent on one or both carbon atoms alpha to a nitrogen atom in the ring, the alkyl radicals having a total of 1 to 6 carbon atoms each.

Among the secondary and tertiary amines all alkyl groups are usually identical but those secondary amines having two different alkyl groups and those tertiary amines having two or three different alkyl groups are equally suitable. The alkyl groups may be branched or unbranched.

Aliphatic amines meeting the definitions of the first two groups above are well-known to the organic chemist and need not be individually recited here. Among the heterocyclic nitrogen compounds of group 3, the essential configuration is a five- or six-membered ring containing at least one nitrogen atom and having an alkyl substituent group alpha to the nitrogen atom. Typical of these are alpha-alkylpyrrole, alpha-alkyl-pyridine, alpha-alkylpyrazine, alkyl-sym-triazine, alpha-alkylquinoline, alpha-alkylisoquinoline, alpha-alkylnaphthyridine, as well as alpha-alpha' substituted compounds such as alpha-alpha' dialkylpyridine, pyrazine, isoquinoline or the like. The alkyl groups may have from 1 to 6 carbon atoms each. Methyl and ethyl substituents are particularly suitable.

In so far as available, the phosphine compounds equivalent to the above-described amines are also suitable as additives in the process of this invention.

The additives of this invention are suitably employed in ratios ranging from 0.01 to 100 moles of the additive per mole of titanium trichloride. Particularly suitable ratios are in the range from 0.5 to 1 mole of additive per mole of titanium trichloride.

In a preferred aspect of this invention, hydrogen is employed for the purpose not only of reducing the molecular weight of the resulting polymer, but of drastically increasing the polymerization rate. The use of hydrogen results in molecular weight reduction with all of the catalyst systems of this invention but results in increased conversion rates only with certain of the additives. No basis has been determined for predicting with which of the systems of this invention hydrogen results in substantial increases in polymerization rate but it has been found to be particularly effective in this respect with trialkyl amines, e.g., tributyl amine. The concentration of hydrogen in the reaction mixture may vary widely. Particularly suitable systems are those in which the reaction mixture is saturated with hydrogen at a pressure in the range from 1 atmosphere or less to 25 atmospheres or more. A noticeable effect may be observed of hydrogen pressures as low as .1 atmosphere.

The process of this invention is effective for the homopolymerization of ethylene and of alpha-monoolefins having 3 or more carbon atoms, e.g., those in the range from 3 to 8 carbon atoms per molecule. In particular, it may be employed for the polymerization of ethylene, propylene, 1-butene and for the copolymerization of alpha-monoolefins such as the copolymerization of ethylene and propylene.

The conditions employed in the polymerization reactions according to this invention are those effective in the polymerization of alpha-monoolefins with Ziegler-type catalysts. Temperatures may suitably range from 0 to about 120° C. with temperatures in the order of about 20° C. to 80° C. being generally preferred. Suitable pressures range from about atmospheric up to several atmospheres, with pressures in excess of 500 p.s.i. rarely being employed. The reaction is preferably carried out in inert diluents such as paraffins of four carbon atoms per molecule or higher, up to the gasoline or kerosene boiling range. The diluents as well as the catalyst components and reactants should be pre-treated to remove harmful impurities such as sulfur, oxygen, moisture, oxygen-containing compounds and the like, since in the absence of metal alkyls the catalyst is particularly sensitive to poisoning by impurities. After the polymerization is complete the polymer is recovered by conventional means, the most common of which includes destroying the catalyst by means of a compound that reacts with and inactivates the catalyst. Such compounds include, for example, lower alcohols such as methanol, ketones such as acetone, and the like, optionally in the presence of an acid such as hydrogen chloride. The slurry of polymer in diluent may be washed, and purified polymer thereafter recovered from the diluent, or other suitable conventional recovery procedures may be employed.

The following examples are illustrative of various aspects of this invention but are not to be considered a limitation thereof.

The following four catalysts are employed in the examples.

Catalyst A.—This is a titanium trichloride of the formula $TiCl_3$, available as a commercial compound under the designation $TiCl_3$-HA from Stauffer Chemical Company. It is understood to be prepared by reduction of titanium tetrachloride with hydrogen at temperatures in excess of 400° C., and converted to an active crystal modification, thought to be the delta form.

Catalyst B.—This catalyst may be designated as $Al_xTi_yCl_z$, wherein $x$, $y$ and $z$ have the approximate relative value 1, 3 and 12. It is available as a commercial material under the designation $TiCl_3$-AA from Stauffer Chemical Company. It is understood to be prepared by reduction of titanium tetrachloride with aluminum metal at temperatures in excess of 400° C., and converted to an active crystal modification, thought to be the delta form.

Catalyst C.—This catalyst is prepared by reaction of 3 moles of titanium tetrachloride with 1 mole of aluminum triethyl at 25° C. in a hydrocarbon solvent. The resulting precipitate is washed five times with heptane and dried at 25° C. and $10^{-5}$ mm. for 20 hours. The catalyst may be considered to have the formula $Al_xTi_yCl_z$ wherein $x$, $y$ and $z$ have the approximate relative values 1, 3 and 12, respectively. The catalyst is the linear beta crystal modification.

Catalyst D.—This catalyst is prepared by reducing 3 moles of titanium tetrachloride with 1 mole of aluminum triethyl at 25° C. and thereafter heating the mixture for three hours at 160° C. The catalyst has the approximate formula $Al_xTi_yCl_z$ wherein $x$, $y$ and $z$ represent 1, 3 and 12, respectively. It has the layer or gamma crystal modification.

Unless otherwise indicated the examples are carried out in the following manner. The designated titanium trichloride catalyst, with or without an additive intended to be studied, is placed in a 240 cc. pressure-resistant bottle containing 150 cc. of heptane solvent. About 20 grams of propylene feed is then added, followed by hydrogen if used. The vessel is then closed and rotated at the specified temperature for a specified length of time in a constant temperature bath. Finally the reaction is terminated by addition of isopropyl alcohol. The polymers are purified and isolated by conventional procedures.

Isotacticity of the formed polypropylene is considered to be indicated by the ratio of infra-red absorption of the polymer at wave lengths of 10.02 and 10.28 microns, respectively. The use of this "$A_{10.02\mu}/A_{10.28\mu}$" ratio is discussed in a paper by Quynn et al. in Journal of Applied Polymer Science, 2, 166 (1959). Values of this ratio in excess of 0.86 indicate substantial stereoregular structure.

Example 1

Representative polymerizations carried out according to the process of this invention with each of the four above-disclosed catalysts are illustrated by the data in Table 1. In each of these experiments triethylamine is employed as an effective additive for activation of the metal alkyl-free titanium trichloride catalyst for the production of stereospecific polymers. All of the experiments are carried out in the absence of hydrogen.

is produced. With additives having a moderate bulk and relatively high basicity, such as triethyl amine, tripropylamine and tributyl amine, no oil is produced and the solid product has a high isotacticity. With more bulky amines such as n-hexyl amine, n-heptyl amine and n-octyl amine, the resulting product obtained with Catalyst A contains increasingly more wax and less stereospecific polymer. The waxy material is essentially an atactic polymer corresponding to that obtaining with conventional Ziegler catalysts under conditions where there is not steric direction of the polymerization. Catalyst D did not lead to production of significant amounts of waxy polymer.

Piperidine inhibits the catalytic activity, due to its high basicity, combined with its substantial lack of bulk. In the presence of piperidine, Catalyst A produces neither significant amounts of oil nor any solid polymer. Triphenyl amine, because of its bulk, completely fails to bring out the stereospecific activity of Catalyst A and does not neutralize the acidic characteristic which leads to the formation of cationically produced oily polymer. At the relatively mild conditions of runs 3–14 to 3–20, various cyclic amines resulted in small, but nevertheless significant yields of stereospecific polymer.

TABLE I

| Example No. | Catalyst Type | Catalyst Mmole | Additive Compound | Additive Mmole | Reaction Conditions Time, days | Reaction Conditions Temp., °C. | Polymer Yield g. | Average Rate, g./(mol $TiCl_3 \times hr. \times atm.\ C_3H_6$) | Polymer Properties I.V. | Polymer Properties Infrared Ratio |
|---|---|---|---|---|---|---|---|---|---|---|
| 1–1 | A | 23 | $Et_3N$ | 10.5 | 28 | 50 | 0.4 | 0.004 | 8 | 0.89 |
| 1–2 | B | 27 | $Et_3N$ | 22 | 28 | 50 | 1.7 | 0.021 | 20 | 0.93 |
| 1–3 | C | 5.7 | $Et_3N$ | 3.7 | 26 | 50 | 19.8 | 0.18 | 17 | 0.90 |
| 1–4 | D | 13 | $Et_3N$ | 7.5 | 26 | 50 | 12.4 | 0.33 | 21 | 0.90 |

Example 2

Comparative experiments, in which propylene is polymerized in one series without additive and in another series with 3 cc. of triethylamine added in each run are illustrated in Table 2. Run lengths are 1, 2 and 6 days. Only oil is produced in the absence of catalyst-modifying additive. The oil has an infra-red spectrum typical of cationically catalyzed propylene polymer. In the presence of triethylamine the same reaction system under identical conditions produces no oily polymer, but instead produces a solid polymer which has intrinsic viscosities of 9.4, 14.5 and 16.9 dl./g. in the 1, 2 and 6 day runs, respectively, and an $A_{10.02\mu}/A_{10.28\mu}$ ratio of 0.93.

TABLE 2

| Example No. | Catalyst Type | Catalyst Weight, g. | Polymer in Absence of Additive, g. Oil | Polymer in Absence of Additive, g. Solid | Polymer in Presence of $Et_3N$, g. Oil | Polymer in Presence of $Et_3N$, g. Solid |
|---|---|---|---|---|---|---|
| 2–1 | C | 4.4 | 5.9 | 0 | 0 | 0.9 |
| 2–2 | C | 4.4 | 8.3 | 0 | 0 | 1.5 |
| 2–3 | C | 4.4 | 20.5 | 0 | 0 | 4.4 |

Example 3

The results of a number of runs illustrating the effect of a variety of representative additives in the polymerization of propylene with metal alkyl-free catalysts are shown in Tables 3 and 4. The catalyst employed in the runs shown in Table 3 is Catalyst A and that in the runs in Table 4 is Catalyst D. The runs in Table 3 are carried out with about 20 g. of propylene, at 50° C. with 28 days polymerization periods. Those in Table 4 are carried out with about 30 g. of propylene, at 23° C. with 7 days polymerization periods.

It will be seen that in the absence of additive only oil

TABLE 3

| Example | Additive, 10 mmole | Oil or Wax | Solid products g. | Solid products Ratio | Solid products I.V., dl./g. |
|---|---|---|---|---|---|
| 3–1 | None | 0.9 g. oil | 0 | | |
| 3–2 | Triethylamine | 0 | 0.40 | .89 | 8 |
| 3–3 | Tri-n-propylamine | 0 | 1.4 | .89 | 12 |
| 3–4 | Tri-n-hexylamine | 0.1 wax | 0.6 | .86 | 16 |
| 3–5 | Tri-n-heptylamine | 0.3 wax | 0.4 | .86 | 12 |
| 3–6 | Tri-n-octylamine | 1.7 wax | 0 | | |
| 3–7 | Triphenylamine | 11.0 oil | 0 | | |
| 3–8 | Piperidine | <0.3 oil | 0 | | |
| 3–9 | Tri-n-butylphosphine. | 0 | 1.7 | .91 | 16 |

TABLE 4

| Example | Additive, 10 mmole | Yield of Solid Polymer, g. |
|---|---|---|
| 3–10 | None | [1] 0 |
| 3–11 | Triethylamine | 2.7 |
| 3–12 | Tri-n-butylamine | 10.1 |
| 3–13 | Tri-n-heptylamine | 4.3 |
| 3–14 | $\alpha,\alpha'$-Dimethylpyridine | 0.05 |
| 3–15 | $\alpha$-Propylpyridine | 0.07 |
| 3–16 | $\alpha$-Ethylpyridine | 0.03 |
| 3–17 | $\alpha$-Methylpyridine | 0.18 |
| 3–18 | Pyridine | 0.15 |
| 3–19 | Quinaldine | 0.09 |
| 3–20 | Diphenylphosphine | 0.31 |

[1] Only oil produced.

Example 4

The effect of hydrogen on conversion rates is illustrated at a variety of conditions in Table 5. Unless otherwise indicated the runs are made in 8 ounce bottles with 100 ml. of heptane, about 2.0 g. of titanium trichloride and about 30 g. of propylene. When hydrogen is used, the reaction mixture is saturated with hydrogen at a total pressure of about 1 atm.

Examples 4–1 through 4–8 illustrate the increase in polymer yield obtained by use of hydrogen when a series of tertiary alkyl amines are used with identical titanium trichloride.

Examples 4–9 through 4–11 illustrate the effect of varying amine concentration, other factors remaining constant.

Examples 4–12 through 4–14 illustrate the significant further increase in conversion rate observed when the reaction temperature is increased. Each of the yields is the average of two separate runs.

Examples 4–15 and 4–16 illustrate the effect of hydrogen with a catalyst system based on Catalyst A and tri-n-butylamine.

TABLE 5

| Example No. | Catalyst Type | Additive Type | Additive Mmole | Reaction Conditions Time, hours | Reaction Conditions Temp., °C. | H₂ added | Polymer yield g. |
|---|---|---|---|---|---|---|---|
| 4-1 | B | Tri-n-heptylamine | 10 | 4 | 35 | Yes | 0.9 |
| 4-2 | B | do | 10 | 4 | 35 | No | 0.1 |
| 4-3 | B | Tri-n-amylamine | 10 | 10 | 35 | Yes | 7.8 |
| 4-4 | B | do | 10 | 4 | 35 | No | 0.2 |
| 4-5 | B | Tri-n-butylamine | 10 | 4 | 35 | Yes | 5.5 |
| 4-6 | B | do | 10 | 4 | 35 | No | 0.5 |
| 4-7 | B | Triethylamine | 10 | 4 | 35 | Yes | 1.6 |
| 4-8 | B | do | 10 | 4 | 35 | No | 0.1 |
| 4-9 | B | Tri-n-butylamine | 5 | 4 | 25 | Yes | 6.5 |
| 4-10 | B | do | 10 | 4 | 25 | Yes | 5.6 |
| 4-11 | B | do | 20 | 4 | 25 | Yes | 1.9 |
| 4-12 | B | Tri-n-butylamine | 10 | 4 | 6 | Yes | 1.1 |
| 4-13 | B | do | 10 | 4 | 23 | Yes | 5.1 |
| 4-14 | B | do | 10 | 4 | 50 | Yes | 11.3 |
| 4-15 | A | Tri-n-butylamine | 10 | 120 | 23 | Yes | 0.7 |
| 4-16 | A | do | 10 | 120 | 23 | No | <0.01 |

Example 5

In a series of runs similar to those of Example 4, made with about 2.0 g. of Catalyst B in heptane at 23° C. for 4 hours each, the propylene concentration was varied from 30 mol percent to 71 mol percent, resulting in increases in polymer yield from 2.1 g. to 6.0 g. By extrapolation, a yield of about 8 g. is predicted for the system in which the reaction medium is pure polypropylene.

Example 6

In separate experiments, 1-butene and 4-methyl-1-pentene are contacted with 4 grams of Catalyst B in 150 ml. of n-heptane in the presence of 20 millimoles of triethylamine. The runs result in yields of about 0.1 gram of polymer, each.

Example 7

Ethylene is polymerized in 1200 ml. glass reactor containing 1000 cc. of n-heptane, 3.5 g. of Catalyst B and 14 millimoles of triethylamine. Ethylene is introduced at 1 atmosphere pressures. With a reaction time of 48 hours at 50° C., a yield of about 4 grams is obtained.

In similar runs, ethylene is polymerized in a 1000 ml. bottle containing 500 cc. of n-heptane, 2 g. of Catalyst B, and 10 millimoles of tri-n-butylamine. Etheylene is introduced in the amount required to saturate the heptane at 25° C. This is 4.8 grams in this instance. The heptane is also saturated with hydrogen. With a reaction time of 4 hours at 25° C., the yield is 1.8 gram of polyethylene.

Example 8

In a stirred glass reactor, ethylene and propylene are copolymerized in 1000 ml. of n-heptane solvent containing 4.0 g. of Catalyst B and 20 mmoles of triethylamine. The ratio of ethylene to propylene in the reaction mixture is 1:12. The reaction is carried out for 5 hours at 50° C. A copolymer is recovered which contains 77 mol percent of ethylene and 23 percent of propylene.

While this invention has been described by reference to illustrative compounds and examples, various modifications will be apparent to chemists skilled in this art and are within the scope of this invention.

In comparing the results of different examples, note should be taken of differences in reactants and reaction conditions between examples. Particularly, increased reaction times result in increased polymer yields with any given system.

Advantages of being able to carry out polymerization in the absence of metal-organic compounds will be readily apparent to persons skilled in this art. One of the major disadvantages of the metal-organic compounds utilized in the Ziegler process is their pyrophoric character, which necessitates special safety precautions whenever they are used. The Lewis bases of this process are not pyrophoric and are relatively safe to use.

We claim as our invention:

1. A process for polymerizing alpha-monoolefins to solid linear polymers which comprises contacting the monoolefin feed, in a liquid reaction mixture which is free of metal-organic compounds and is saturated with hydrogen at a partial pressure of at least 0.1 atmosphere with a catalyst consisting of the reaction product of catalytically active titanium trichloride and a catalytically effective amount of an amine or phosphine which has a $pK_a$ greater than −4 and a molecular volume in the range from that of triethyl amine to that of tri-dodecylamine, said reaction product being free of metal-organic compounds, whereby the rate of the polymerization reaction is substantially increased over the rate in the absence of hydrogen.

2. A process according to claim 1 wherein said alpha-monoolefin has from 2 to 8 carbon atoms per molecule.

3. A process for polymerizing alpha-monoolefins of from 2 to 4 carbon atoms per molecule to solid linear polymers which comprises contacting the monoolefin feed, in a liquid reaction mixture which is free of metal-organic compounds and is saturated with hydrogen at a partial pressure in the range from about 1 atmosphere to about 25 atmospheres with a catalyst consisting of the reaction product of catalytically active titanium trichloride and a catalytically effective amount of an amine having a $pK_a$ greater than −4 and a molecular volume in the range from that of triethylamine to that of tri-dodecylamine, said reaction product being free of metal-organic compounds, whereby the rate of the polymerization reaction is substantially increased over the rate in the absence of hydrogen.

4. A process according to claim 3 wherein said monoolefin feed consists of propylene.

5. A process according to claim 3 wherein said amine is a trialkyl amine having from 5 to 36 carbon atoms per molecule and said hydrogen partial pressure is in the range of from about 1 to about 25 atmospheres 6. A process according to claim 3 wherein said amine is a dialkylamine having from 6 to 24 carbon atoms per molecule.

7. A process according to claim 3 wherein said amine is a monocyclic heterocyclic nitrogen compound having from 5 to 6 atoms in the ring.

8. A process according to claim 3 wherein said titanium chloride is prepared by reduction of titanium tetrachloride with an aluminum trialkyl compound, the product of said reaction being thereafter completely freed of residual aluminum trialkyl.

9. A process for polymerizing propylene to a stereoregular, solid polymer which comprises contacting propylene in a liquid reaction mixture which is free of metal-organic compounds and is saturated with hydrogen at a partial pressure of from about 1 atmosphere to about 25 atmospheres, at a temperature from 0° to 120°

C., with a catalyst consisting of the reaction product of catalytically active titanium trichloride and from about 0.5 to about 1 mole, per mole of titanium trichloride, of a trialkylamine having from 2 to 7 carbon atoms per alkyl group.

10. A process according to claim 9 wherein said reaction mixture is saturated with hydrogen at a hydrogen partial pressure in the range from about 1 to about 25 atmospheres.

11. A process according to claim 10 wherein said amine is tri-n-butylamine.

12. A process for polymerizing alpha-monoolefins of from 2 to 4 carbon atoms per molecule to solid linear polymers which comprises contacting the monoolefin feed, in a liquid reaction mixture which is free of metal-organic compounds and is saturated with hydrogen at a partial pressure of at least 0.1 atmosphere with a catalyst consisting of the reaction product of catalytically active titanium trichloride and a catalytically effective amount of a phosphine having a $pK_a$ greater than $-4$ and a molecular volume in the range from that of triethylamine to that of tri-dodecylamine, said reaction product being free of metal-organic compounds, whereby the rate of the polymerization reaction is substantially increased over the rate in the absence of hydrogen.

References Cited

UNITED STATES PATENTS

| | | | |
|---|---|---|---|
| 3,331,827 | 7/1967 | McCall et al. | 260—94.9 |
| 3,256,259 | 6/1966 | Seger et al. | 260—93.7 |
| 3,225,024 | 12/1965 | D'Alelio | 260—94.9 |
| 3,225,021 | 12/1965 | Erchak et al. | 260—93.7 |
| 3,051,690 | 8/1962 | Vandenberg | 260—94.9 |
| 3,116,274 | 12/1963 | Boehm et al. | 260—94.9 |
| 3,026,309 | 3/1962 | Coover | 260—93.7 |
| 2,976,272 | 3/1961 | Coover et al. | 260—94.9 |
| 2,972,608 | 2/1961 | Coover et al. | 260—93.7 |
| 2,912,424 | 11/1959 | Cash | 260—94.9 |

JOSEPH L. SCHOFER, *Primary Examiner.*

M. B. KURTZMAN, *Assistant Examiner.*